United States Patent [19]

Davis et al.

[11] Patent Number: 6,069,559

[45] Date of Patent: May 30, 2000

[54] PROGRAMMABLE TURN SIGNAL AND HAZARD FLASHER CONTROL SYSTEM

[75] Inventors: Christopher F. Davis, Lake Orion, Mich.; Jeffrey S. Kiko, Cortland, Ohio; John D. Simon, Rochester Hille, Mich.; Brian Douglas Pasha, Cortland, Ohio; Michael Joseph Dreon, Rochester, Mich.; Andrew Joseph Jozwiak, Rochester Hills, Mich.; Bruce W. Crofts, Highland, Mich.

[73] Assignee: General Motors Corporation, Detroit, Mich.

[21] Appl. No.: 09/266,384

[22] Filed: Mar. 11, 1999

[51] Int. Cl.$^7$ ........................................................ B60Q 1/26
[52] U.S. Cl. .................... 340/468; 340/471; 340/475; 340/664
[58] Field of Search ................................ 340/468, 471, 340/472, 475, 661, 664

[56] References Cited

U.S. PATENT DOCUMENTS

| | | | |
|---|---|---|---|
| 4,302,748 | 11/1981 | Gant | 340/471 |
| 4,380,753 | 4/1983 | Gant | 340/471 |
| 5,072,210 | 12/1991 | Kimmelman | 340/458 |
| 5,247,280 | 9/1993 | Brooks | 340/458 |
| 5,585,784 | 12/1996 | Pabla et al. | 340/475 |
| 5,805,061 | 9/1998 | Fritz et al. | 340/471 |

*Primary Examiner*—Edward Lefkowitz
*Attorney, Agent, or Firm*—Vincent A. Cichosz

[57] ABSTRACT

A programmable turn signal and hazard flasher control system (10, 100) includes a lamp control module (12, 108) coupling a turn signal request unit (14, 106) to a number of turn signal lamps (20–30). The module (12, 108) couples the turn signal request unit (14, 106) to a number of vehicle turn signal lamps (20–26) in a first mode of operation and to a number of vehicle turn signal lamps (20–26) as well as a number of additional turn signal lamps (28, 30) in a second mode of operation to thereby accommodate lighting requirements of a trailer or other towed vehicle or to accommodate different lighting requirements in vehicles of a common vehicle platform. The load current to the turn signal lamps (20–30) in either case flows through a shunt resistor R1, and is controlled by a flasher circuit (54) during normal operation to a first flash rate and during a lamp failure condition to a second faster flash rate. The module (12, 108) further includes a control circuit (62) responsive to an appropriate signal state at a lamp designation control input (34) to provide a predefined load activation signal to the flasher circuit (54) regardless of whether the module (12, 108) is coupled to only a minimum number of vehicle turn signal lamps, or the minimum number of vehicle turn signal lamps as well as a number of additional turn signal lamps.

20 Claims, 5 Drawing Sheets

PROGRAMMABLE TURN SIGNAL AND HAZARD FLASHER CONTROL SYSTEM

FIELD OF THE INVENTION

The present invention relates generally to controlling the operation of motor vehicle turn signal and hazard flasher systems, and more specifically to controlling such systems to allow for a plurality of different lamp configurations.

BACKGROUND OF THE INVENTION

Various electromechanical systems for controlling the operation of motor vehicle turn signal and hazard flasher systems are known and widely used in the automotive and related industries. Some such systems include a single output control module that distributes a flashing signal to the various lamps of the vehicle according to a selected signal function. These types of systems typically include a number of switches integrated into the steering column, whereby the switches are appropriately controlled to distribute the flashing signal to one or more of the vehicle lamps. Other known turn signal and hazard lamp control systems include a multiple output control module. These types of modules typically include multiple inputs for receiving the various turn signal and/or hazard signal requests, whereby the control module is operable to direct the selected signal function to the appropriate lamp output or outputs.

Regardless of the actual configuration of the turn signal and hazard flasher control system, vehicle lamp configurations are typically described in terms of the number of lamps required to be illuminated during turn and/or hazard modes of operation. Vehicle lamp arrangements are thus typically denoted as "x:y", wherein the first number, x, refers to the number of lamps illuminated during turn signal operation and the second number, y, refers to the number of lamps illuminated during hazard mode. For example, many passenger vehicle applications are denoted as "2:4" since two lamps are typically illuminated during turn mode and four lamps are illuminated during hazard mode. Other passenger vehicle applications as well as standard passenger vehicle applications having a trailer or other towed vehicle attached thereto are denoted as "3:6" since three lamps are typically illuminated during turn mode and six lamps are illuminated during hazard mode.

Pertinent U.S. and European legal regulations require detection and driver notification of failure of one or more of the turn signal lamps. European legal regulations further require detection and driver notification of failure of one or more turn signal lamps of an attached trailer or other towed vehicle, although the U.S. regulations currently have no such requirement. In either case, one known technique for detecting failure of a turn signal lamp is to measure lamp current via one or more shunt resistors in series with one or more of the vehicle lamps. Upon detection of a drop in current due to one or more lamp failures, one common form of providing a driver warning is to change the frequency of the flash signal, typically by doubling the lamp flash rate.

One drawback associated with the use of one or more shunt resistors in detecting turn signal lamp failures is that the threshold current for detection of one or more lamp failures depends upon the number and wattages of the various lamps in the turn signal and hazard flasher system. Thus, for example, a 2:4 system having a single shunt resistor through which all lamp current passes has a different failure current threshold than the same shunt resistor in a 3:6 system. Accordingly, a shunt-based turn signal lamp failure detection system designed for a particular number of turn signal lamps having specific wattages will not work properly if a trailer is attached to the vehicle and/or if the number/wattages of the various turn signal lamps in the vehicle are changed.

One known technique for overcoming the foregoing drawback is disclosed in U.S. Pat. No. 5,805,061 to Fritz et al. The Fritz et al. system includes a memory circuit having a load failure threshold voltage stored therein and circuitry for monitoring the voltage across a shunt resistor and comparing the shunt resistor voltage to the stored load failure threshold voltage. If the shunt resistor voltage is lower than the stored load failure threshold voltage, a lamp failure is detected and the turn signal/hazard flashing rate is doubled. If, on the other hand, the shunt resistor voltage is higher than the stored load failure threshold voltage, this indicates that additional lamps have been added to the system (e.g., a trailer has been attached to the vehicle) and/or the wattages of the existing turn signal lamps have been increased. In this case, a second higher load failure threshold voltage, corresponding to the newly detected higher shunt resistor voltage, is stored in memory and the measured shunt resistor voltage is thereafter compared to the second load failure threshold voltage for monitoring of turn signal lamp failures.

While the Fritz et al. reference appears to address the problem with shunt-based lamp failure detection systems described hereinabove, it has several drawbacks associated therewith. For example, the Fritz et al. circuitry requires a memory unit and a number of comparator circuits in addition to the conventional flasher circuitry, and is accordingly unnecessarily complex. Further, the Fritz et al. system does not appear to account for the possibility that additionally connected lamps may be failed prior to connection. The Fritz et al. system accordingly may not be able to detect operational failures associated with pre-failed lamps.

What is therefore needed is an improved shunt-based turn signal and hazard flasher control system that is operable to detect lamp failures in a number of lamp configuration systems. Such a control system should preferably be reliable, simple in construction and operable to detect operational as well as preexisting lamp failures.

SUMMARY OF THE INVENTION

The foregoing shortcomings of the prior art are addressed by the present invention. In accordance with one aspect of the present invention a programmable turn signal and hazard flasher control system comprises a shunt resistor having one end adapted for connection to a voltage source and an opposite end adapted for coupling in a first mode to a first number of vehicle loads and in a second mode to a second number of vehicle loads, means responsive to a load activation request signal for conducting a first load current through the shunt resistor in the first mode and a second load current through the shunt resistor in the second mode, and a control circuit having a first input connected to the opposite end of the shunt resistor, a second input and an output. The control circuit is responsive to a first signal state at the second input to produce a load activation signal at the output when the shunt resistor is conducting the first load current therethrough, and to a second signal state at the second input to produce the load activation signal at the output when the shunt resistor is conducting the second load current therethrough. A monitoring circuit has an input coupled to the output of the control circuit and produces a warning signal at an output thereof if the load activation signal falls outside of a load activation signal range.

In accordance with another aspect of the present invention, a programmable turn signal and hazard flasher control system comprises a shunt resistor having one end connected to a voltage source and an opposite end coupled in a first mode to a first number of turn signal illumination devices and in a second mode to a second number of turn signal illumination devices, means for activating at least one of the first number of turn signal illumination devices in the first mode and at least one of the second number of turn signal illumination devices in the second mode, and a control circuit having a first input connected to the opposite end of the shunt resistor, a second input and an output. The control circuit is responsive to a first signal state at the second input to produce a load activation signal when the at least one of the first number of turn signal illumination devices is activated in the first mode and to a second signal state at the second input to produce the load activation signal at the output when the at least one of the second number of turn signal illumination devices is activated in the second mode. A monitoring circuit has an input coupled to the output of the control circuit and produces a warning signal at an output thereof if the load activation signal falls outside of a load activation signal range.

One object of the present invention is to provide a programmable turn signal and hazard flasher control system that is operable to control turn signal and hazard flasher operation as well as detect and provide notification of turn signal failures for at least two different turn signal lamp configurations.

Another object of the present invention is to provide such a system wherein a first turn signal lamp configuration corresponds to a first number of turn signal lamps associated with a vehicle and a second turn signal lamp configuration corresponds to a second number of turn signal lamps associated with a vehicle and with a towed vehicle such as a trailer.

Yet another object of the present invention is to provide such a system wherein a first turn signal lamp configuration corresponds to the conventional turn signal lamps associated with the vehicle and the second turn signal lamp configuration corresponds to the conventional turn signal lamps associated with a vehicle as well as optional turn signal lamps associated with the vehicle.

These and other objects of the present invention will become more apparent from the following description of the preferred embodiments.

DESCRIPTION OF THE PREFERRED EMBODIMENTS

Figure 1:
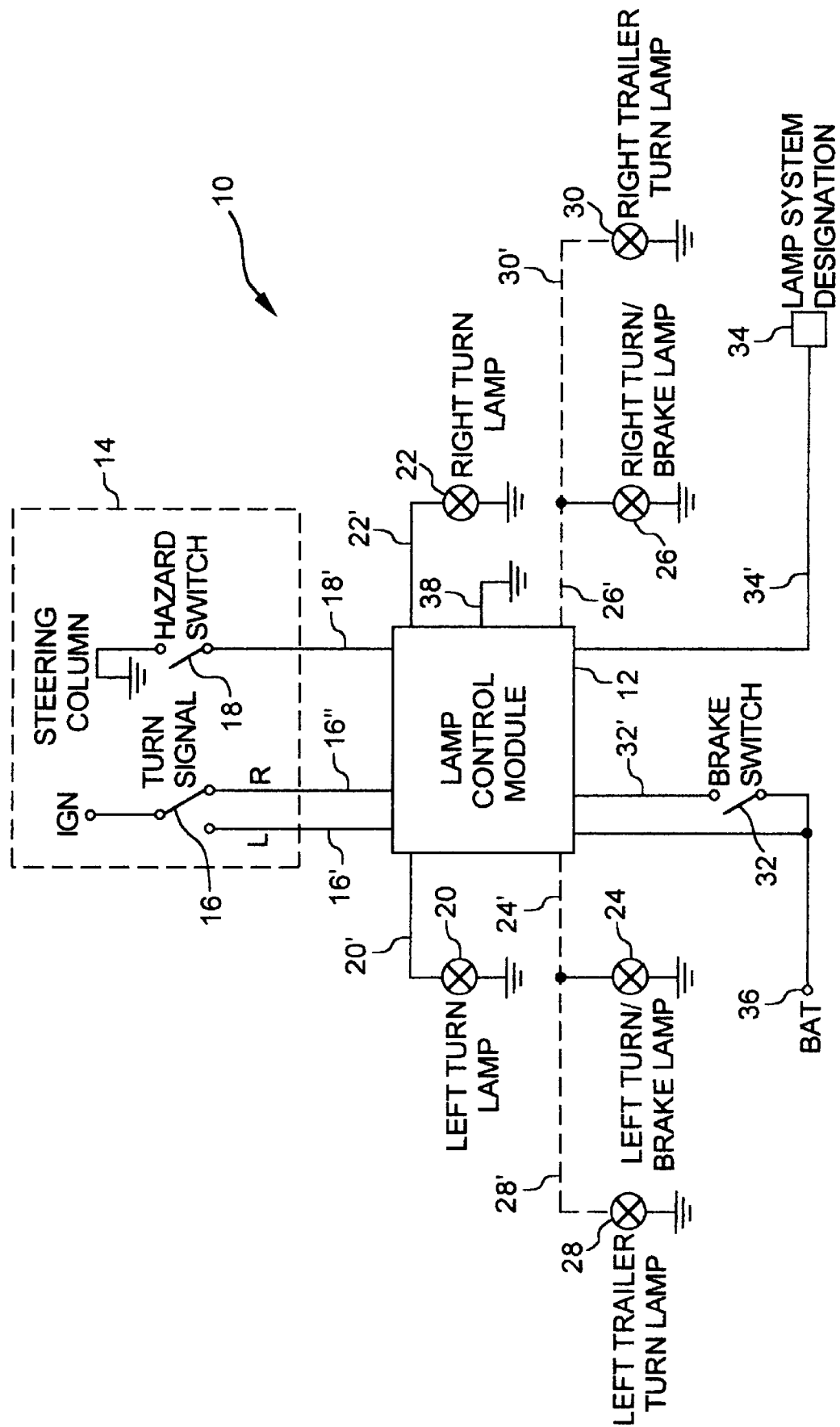
FIG. 1 is a diagrammatic illustration of one preferred embodiment of a programmable turn signal and hazard flasher control system, in accordance with the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further application of the principles of the invention as illustrated therein being contemplated as would normally occur to one skilled in the art to which the invention relates.

Referring now to FIG. 1, one preferred embodiment of a turn signal and hazard flasher control system 10, in accordance with the present invention, is shown. System 10 includes a lamp control module having a number of inputs connected to various input signal sources and a number of outputs connected to a number of illumination devices. A turn signal switch 16 of known construction includes a switch input connected to a voltage supply IGN which, in one embodiment, corresponds to a switched battery voltage. A first output of turn signal switch 16 corresponds to a left turn signal position and is connected to a left turn signal input of lamp control module 12 via signal path 16'. A second output of turn signal switch 16 corresponds to a right turn signal position and is connected to a right turn signal input of lamp control module 12 via signal path 16". A hazard switch 18 of known construction includes one end connected to a reference potential which, in one embodiment, is ground potential, and an opposite end connected to a hazard signal input of lamp control module 12 via signal path 18'. Switches 16 and 18 may be provided as separate switches or may alternatively be provided as a combined switch module 14 as shown in phantom in FIG. 1. In either case switches 16 and 18 are preferably located on or integral with the vehicle steering column, although the present invention contemplates that switches 16 and/or 18 may alternatively be positioned at other operator-accessible locations.

System 10 further includes a left turn signal lamp or other illumination device 20 connected to a corresponding left turn signal output of lamp control module 12 via signal path 20', wherein lamp 20 preferably corresponds to a front left vehicle turn lamp. A right turn signal lamp or other illumination device 22 is connected to a corresponding right turn signal output of lamp control module 12 via signal path 22', wherein lamp 22 preferably corresponds to a front right vehicle turn lamp. A second left turn signal lamp or other illumination device 24 is connected to a corresponding left turn signal lamp output of lamp control module 12 via signal path 24'. In one embodiment, lamp 24 is a combination left turn signal and brake lamp, and in any case lamp 24 preferably corresponds to a left rear vehicle lamp. A second right turn signal lamp or other illumination device 26 is connected to a corresponding right turn signal lamp output of lamp control module 12 via signal path 26'. In one embodiment, lamp 26 is a combination right turn signal and brake lamp, and in any case lamp 26 preferably corresponds to a right rear vehicle lamp.

Lamps 20–26 define a first lamp configuration that preferably corresponds to the four turn signal/hazard lamps typically associated with over the road vehicles. As will be described more fully hereinafter, system 10 is operable to accommodate a second lamp configuration, wherein one example of such a second lamp configuration is illustrated in phantom in FIG. 1 as including a left auxiliary turn signal lamp or other illumination device 28 connected to signal path 24' via signal path 28', and a right auxiliary turn signal lamp or other illumination device 30 connected to signal path 26' via signal path 30'. In one embodiment, lamps 28 and 30 correspond to left and right rear turn signal/hazard lamps of a trailer or other towed vehicle, although the present invention contemplates that lamps 28 and 30 may alternatively correspond to optional turn signal and/or hazard lamps associated with the vehicle carrying lamps 20–26.

System 10 further includes a brake switch 32 of known construction having one end connected to a voltage supply 36 which, in one embodiment corresponds to the vehicle battery BAT, and an opposite end connected to a brake switch input of lamp control module 12 via signal path 32'. BAT 36 is also supplied to module 12, as is a ground reference 38. System 10 further includes a lamp system designation terminal 34 connected to a corresponding lamp system designation input of lamp control module 12 via signal path 34'.

In accordance with one embodiment of the present invention, the lamp system designation terminal 34 of system 10 provides a means for programming lamp control module 12 for lamp failure detection in either of the two lamp configurations described hereinabove. For example, lamp control module 12 may be programmed for a 2:4 lamp system if a first voltage level is established at the lamp system designation terminal 34, while lamp control module 12 may be programmed for a 3:6 lamp system if a second different voltage level is established at the lamp system designation terminal 34. Those skilled in the art will recognize, however, that the lamp control module 12 may be alternatively configured to be programmable for lamp failure detection in any number of lamp configurations by providing for a corresponding number of discrete voltage level designations at lamp system designation terminal 34. Those skilled in the art will further recognize that modification of lamp control module 12 to accommodate more than two lamp configurations would be a mechanical step, and that such multiple lamp configurations fall within the scope of the present invention.

Figure 2:
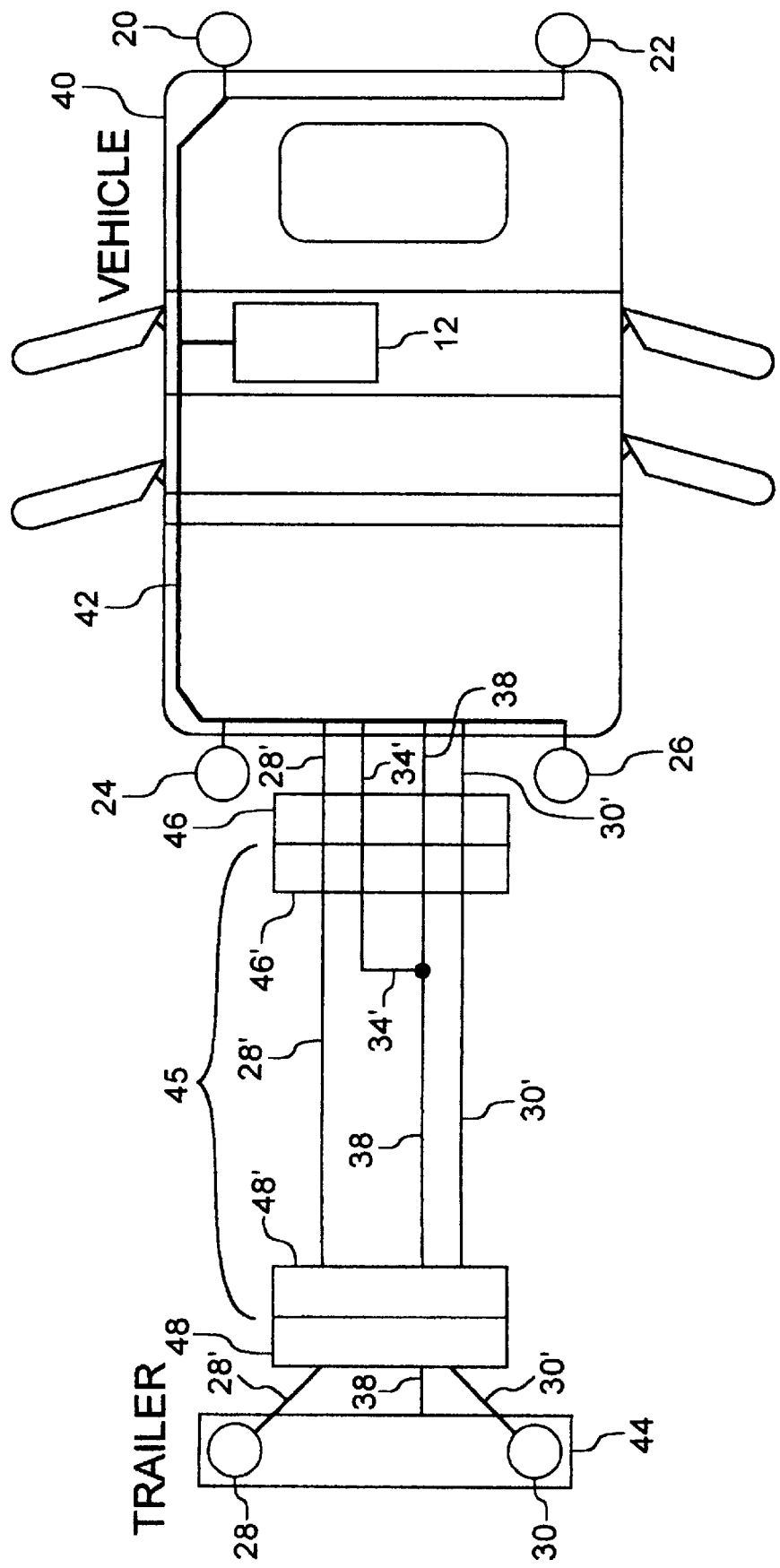
FIG. 2 is a diagrammatic illustration of one preferred embodiment for determining a current lamp system designation, according to the present invention.

Referring now to FIG. 2, one preferred structure for interfacing with the lamp system designation terminal 34 for programming lamp control module 12 for either a 2:4 lamp configuration associated with a vehicle 40 or a 3:6 lamp configuration associated with the vehicle 40 and trailer or other towed vehicle 44, is illustrated. In FIG. 2, vehicle 40 is illustrated as having lamps 20–26 connected to lamp control module 12 via a common signal path 42, wherein signal path 42 represents a signal bus or wiring harness including at least signal paths 20'–34' of FIG. 1. Vehicle 40 includes an electrical connector 46 connected to at least signal paths 28', 30', 34' and 38. Trailer or other towed vehicle 44 also includes an electrical connector 48 connected to at least signal paths 28', 30' and 38 for providing appropriate electrical connections to trailer lamps 28 and 30. An electrical interface 45 is provided having an electrical connector 48' at one end and configured for electrical connection to connector 48, and an electrical connector 46 at an opposite end and configured for electrical connection to connector 46. With interface 45, signal paths 28' and 30' complete the corresponding electrical connections between lamps 28 and 30 and lamp control module 12. However, within interface 45, signal path 34' is hard wired to signal path 38 whereby the lamp system designation terminal 34 of system 10 is automatically grounded via connection of interface 45 as illustrated in FIG. 2. In the absence of interface 45, the lamp system designation terminal 34 is left floating. Thus, in the example illustrated in FIG. 2, lamp control module 12 is programmed for a 2:4 lamp configuration whenever interface 45 is not in place whereby lamp system designation terminal 34 is left floating, and lamp control module 12 is programmed for a 3:6 lamp configuration whenever interface 45 is in place whereby lamp system designation terminal 34 is grounded.

Figure 3:
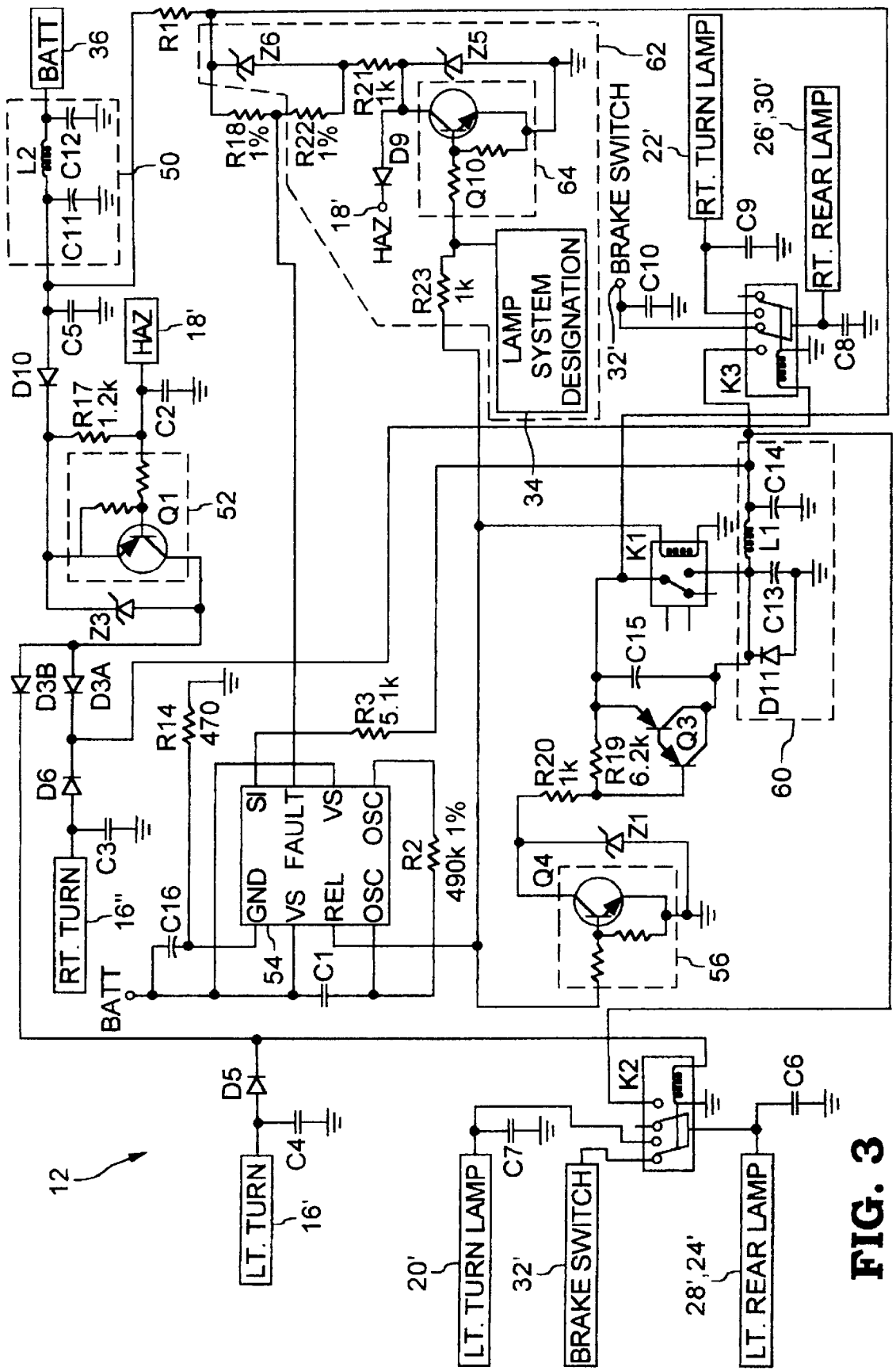
FIG. 3 is a schematic diagram illustrating one preferred embodiment of the lamp control module of FIG. 1, in accordance with the present invention.

Referring now to FIG. 3, one preferred embodiment of the lamp control module 12 of FIGS. 1 and 2, in accordance with the present invention, is shown. Battery voltage 36 is provided to a battery line filter 50 comprising a series connected inductor L2 having capacitors C11 and C12 to ground on either side thereof. The filtered battery line is connected to one end of a capacitor C5, to an anode of a diode D10 and to one end of a shunt resistor R1. The opposite end of capacitor C5 is grounded and the cathode of diode D10 is connected to one end of a resistor R17, to an emitter of a PNP transistor Q1, and to a cathode of a zener diode Z3. The opposite end of R17, which in one embodiment is 1.3 kU, is coupled to the base of Q1 via a first bias resistor, wherein a second bias resistor is connected between the base and emitter of Q1. Transistor Q1 and the two bias resistors comprise a transistor circuit 52. The collector of transistor Q1 is connected to the anode of zener diode Z3 and to the anodes of diodes D3A and D3B.

The cathode of diode D3A is connected to the cathode of a diode D6 and to an energize input of a relay K3. The anode of D6 is connected to one end of a capacitor C3 and to the right turn signal input line 16". The opposite end of C3 is connected to ground potential. The cathode of diode D3B is connected to the cathode of a diode D5 and to an energize input of a relay K2. The anode of D5 is connected to one end of a capacitor C4 and to the left turn signal input line 16'. The opposite end of C4 is connected to ground potential.

Relay K2 has a first "deenergized" relay position that connects the left rear turn signal paths 24' (and 28' when a trailer is connected) to the brake switch signal path 32', wherein signal paths 24' and 28' are connected to one end of a capacitor C6, the opposite end of which is connected to ground potential. Relay K2 has a second "energized" relay position that connects signal paths 24' and 28' to left turn signal path 20', and to a signal input SI of a flasher circuit 54 through resistor R3 which, in one embodiment, is 5.1 kO, and to an output of a load line filter 60. Signal path 20' is connected to one end of a capacitor C7, the opposite end of which is connected to ground potential.

Relay K3 has a first "deenergized" relay position that connects the right rear turn signal paths 26' (and 30' when a trailer is connected) to the brake switch signal path 32', wherein signal paths 26' and 30' are connected to one end of a capacitor C8, and signal path 32' is connected to one end of a capacitor C10. The opposite ends of C8 and C10 are connected to ground potential. Relay K3 has a second "energized" relay position that connects signal paths 26' and 30' to right turn signal path 22', to a signal input SI of a flasher circuit 54 through resistor R3, and to an output of load line filter 60. Signal path 22' is connected to one end of a capacitor C9, the opposite end of which is connected to ground potential.

Flasher circuit 54 includes a GND terminal connected to one end of a resistor R14 and to one end of a capacitor C16. In one embodiment, R14 is 470 U. A pair of VS inputs are connected to voltage supply BAT, to the opposite end of capacitor C16 and to one end of a capacitor C1. The opposite end of capacitor C1 is connected to a first OSC input and to one end of a resistor R2, the opposite end of which is connected to a second OSC input. In one embodiment, R2 is 490 kO, 1%. A FAULT input of circuit 54 is connected to one end of a resistor R18 and to one end of a resistor R22, each of which are preferably 1% resistors. A REL output of circuit 54 is connected to a base terminal input of a NPN transistor circuit 56, to an energize input of a relay K1 and to one end of a resistor R23 which, in one embodiment, is 1 kO.

In one embodiment, flasher circuit 54 is an 18-mO shunt flasher circuit, part number U60443B and available from TEMIC TELEFUNKEN Semiconductors of Heilbronn, Germany. In this embodiment, R1 is accordingly a 18 mO resistor. It is to be understood, however, that the present invention contemplates using other known flasher circuits 54 and that shunt resistor R1 may be some value other than 18 mU.

The REL output of circuit 54 is coupled to a base of a NPN transistor Q4 through a first bias resistor, wherein a second bias resistor is connected between the base and emitter of Q4 with the emitter of Q4 grounded. Transistor Q4 and the two bias resistors define transistor circuit 56. The collector of Q4 is connected to the cathode of a zener diode Z1 and to one end of a resistor R20 which, in one embodiment, is 1 kO. The anode of Z1 is connected to ground potential. The opposite end of R20 is connected to one end of a resistor R19 and to the base of a PNP darlington transistor pair Q3. The emitter of the darlington pair Q3 is connected to the opposite end of R19 which, in one embodiment, is 6.2 kO, to one end of a capacitor C15, to an input of a relay K1, to the opposite end of shunt resistor R1, to a cathode of a zener diode Z4 and to the opposite end of transistor R18. The opposite end of C15 is connected to the collector of Q3, to an "energized" switch position of K1, to a cathode of a diode D11, to one end of a capacitor C13 and to one end of an inductor L1. The "deenergized" switch position of K1 is open. The opposite end of capacitor C13 is connected to the anode of D11 and to ground potential. The opposite end of L1 is connected to a capacitor C14, to the "deenergized" switch positions of K2 and K3 and to resistor R3. The opposite end of C14 is connected to ground potential. Diode D11, capacitors C13 and C14 and inductor L1 comprise a known load line filter 60.

The circuitry 12 described thus far with respect to FIG. 3 is known both in structure and operation. In accordance with the present invention, circuitry 12 further includes a control circuit 62 operable to monitor the lamp system designation terminal 34 and maintain the voltage level at the FAULT input of flasher circuit 54 constant whenever lamp current is flowing through shunt resistor R1 regardless of the lamp configuration (e.g., either a 2:4 or a 3:6 lamp system). Lamp system designation terminal 34 is connected to the opposite end of R23 and to a base input of a NPN transistor circuit 64 including two bias resistors connected to a NPN transistor Q10 as described with respect to transistor circuit 56. The emitter of transistor Q10 is connected to ground potential and to an anode of a zener diode Z5, the cathode of which is connected to the collector of Q4, to an anode of a diode D9 and to one end of a resistor R21 which, in one embodiment, is 1 kO. The cathode of diode D9 is connected to the hazard input signal path 18' and the opposite end of R21 is connected to the opposite end of R22 and to the anode of a zener diode Z6. The cathode of Z6 is connected to R18 and to shunt resistor R1.

In the operation of circuitry 12, if neither the turn signal switch 16 nor the hazard switch 18 is activated, none of the relays K1–K3 are energized and the brake switch signal line 32' is accordingly connected to lamp outputs 24', 26', 28' and 30'. Thus, if the vehicle brakes are activated, brake switch 32 closes and battery voltage BAT is connected to lamps 24–30 to thereby illuminate the rear turn signal lamps during braking as is known in the art.

Activation of the turn signal switch 16 (left or right turn) and/or hazard switch 18 results in the activation of an appropriate one, or both, of relays K2 and K3 to an "energized" switch position. Energization of K2 and/or K3 establishes an appropriate voltage at input S1 of circuit 54 to begin operation of circuit 54, whereby capacitor C1 and resistor R2 define the circuit flashing rate. Circuit 54 is operable to provide a periodic signal (at the predefined flashing rate) via the REL output which periodically energizes relay K1 and thereby causes current to periodically flow through shunt resistor R1 to appropriate ones of the vehicle turn signal lamps. When energized, the current flow through R1 to the one or more vehicle lamps establishes a FAULT voltage at the FAULT input of circuit 54. Circuit 54 is operable to compare the FAULT voltage with a predefined threshold voltage, and if the FAULT voltage falls below the predefined threshold voltage, which occurs if at least one of the vehicle lamps is nonfunctional, circuit 54 is operable to double the flashing rate to thereby provide a visual warning to the vehicle operator indicative of a lamp failure.

Under operating conditions wherein the lamp system designation terminal 34 is left floating, such as when system 10 is controlling a 2:4 lamp system (e.g. no trailer 44 connected to the vehicle 40), the periodic voltage at REL of circuit 54 causes a corresponding periodic activation of transistor Q10. Activation of Q10 causes the FAULT voltage to be defined as the battery voltage BATT less the voltage drop across resistor R1 less the voltage drop across resistor R18, where R18 is part of a resistor divider network composed of R18 and R22. The values of resistors R18 R22 are accordingly chosen such that the voltage at the FAULT terminal of circuit 54 under normal operating conditions is above the fault condition threshold. In this first operational mode, if at least one of the activated vehicle lamps is non-functioning, the FAULT voltage will drop below the predefined fault condition threshold and circuit 54 will, in turn, respond to the lamp failure condition by increasing the lamp flashing rate (e.g. double the flashing rate) as previously described.

In a second mode of operation, if the number of vehicle lamps is increased, such as by connecting a trailer 44 to vehicle 40 or by adding auxiliary turn signal lamps to vehicle 40, the voltage at the connection of R1 and R18 will decrease due to the parallel connection of the additional turn signal lamps. The voltage drop across R18 will likewise decrease and, if lamp system designation terminal 34 is left floating, will define a FAULT voltage at the FAULT input of circuit 54 that is too low. If the established FAULT voltage is at or below the predefined fault condition threshold, flasher circuit 54 will erroneously detect a lamp failure when none actually exists. In this second mode of operation (i.e. whenever the number of vehicle turn signal lamps is increased such as by connecting a trailer 44 to vehicle 40 or by adding auxiliary turn signal lamps to vehicle 40), the lamp system designation terminal 34 is accordingly grounded which results in the deactivation of transistor Q10. Under such conditions, the voltage at the FAULT terminal of circuitry 54 is defined by the voltage at the common connection of R1, Z6 and R18, thereby defining a FAULT voltage at the FAULT input of circuit 54 that is approximately equal to the FAULT voltage established at the FAULT input when transistor Q10 is activated. In other words, the FAULT voltage established by control circuit 62 is preferably designed to be approximately the same in either the first or second mode of operation; i.e. for either a 2:4 or a 3:6 lamp system. In this manner, the voltage at the FAULT terminal of circuit 54 remains relatively constant under turn signal lamp activation conditions regardless of whether module 12 is controlling a 2:4 or a 3:6 lamp system.

Figure 4:
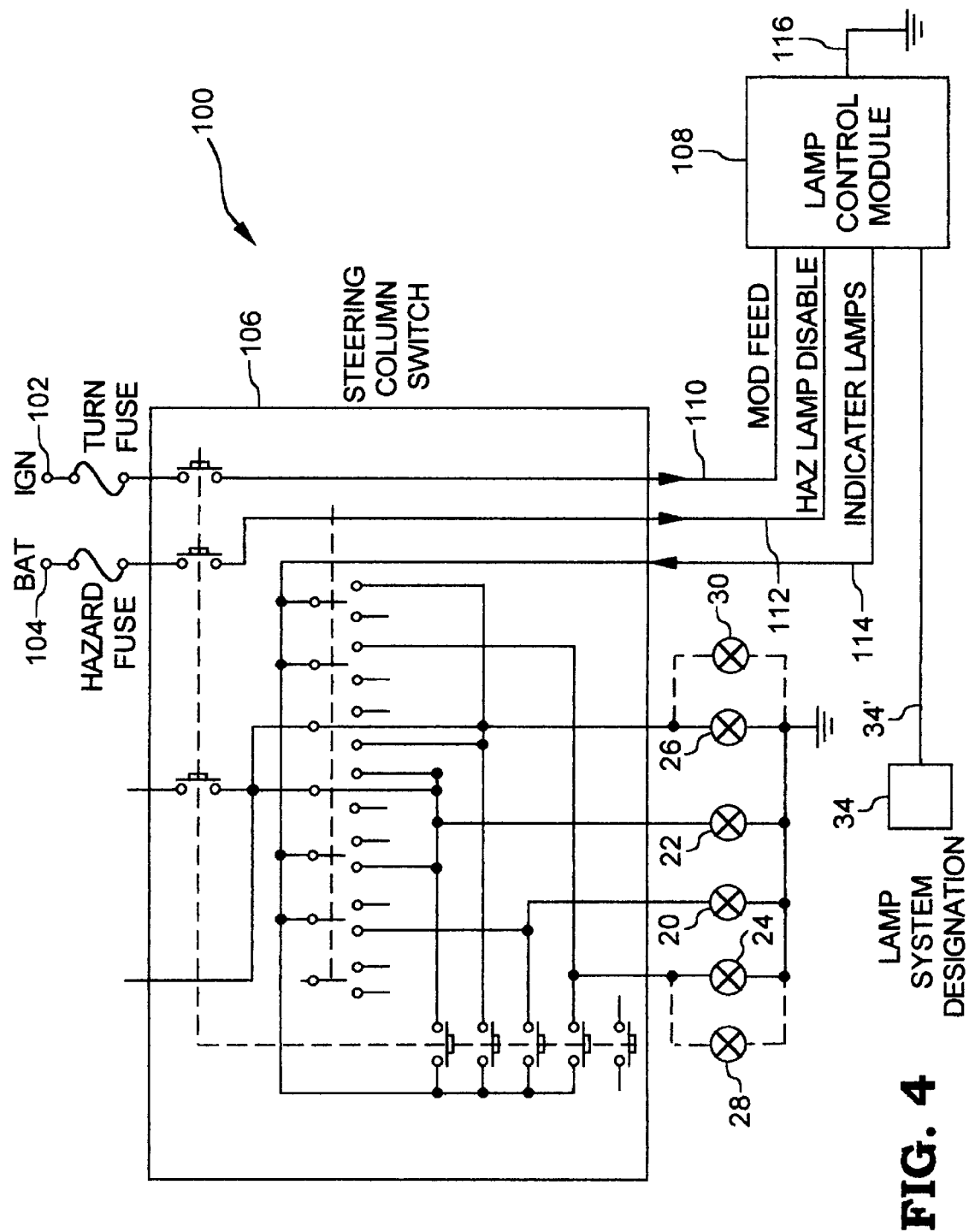
FIG. 4 is a diagrammatic illustration of an alternate embodiment of a programmable turn signal and hazard flasher control system, in accordance with the present invention.

The embodiment of system 10 illustrated in FIGS. 1 and 3 implements a multiple input, multiple output lamp control module 12. Alternatively, the concepts of the present invention may be applied to a single input, single output lamp control module. Referring to FIG. 4, one embodiment of a turn signal and hazard flasher control system 100 implementing a single input, single output lamp control module 108, in accordance with the present invention, is shown. System 100 includes a switch module 106 of known construction and having fused electrical connections to a battery voltage BAT 104 and a switched battery voltage IGN 102. Module 106 is preferably coupled to or integral with a steering column of the vehicle, but may alternatively be positioned at some other convenient location accessible by the vehicle operator. Switched outputs of module 106 are connected to vehicle turn signal lamps 20–26, and auxiliary turn signal lamps 28 and 30 (e.g. turn signal lamps associated with a trailer 44 or other towed vehicle, or auxiliary turn signal lamps associated with the vehicle 40 itself) are connectable to lamps 24 and 26 respectively as shown in phantom in FIG. 4. Lamps 20–30 correspond to those of like number in FIGS. 1–3.

Single input, single output lamp control module 108 is operable to receive a MOD FEED signal input from module 106 via signal path 110, wherein an active MOD FEED signal corresponds to operator activation of a turn signal switch or hazard switch (not shown). Module 108 is also operable to receive a Hazard Lamp Disable signal from module 106 via signal path 112, wherein the Hazard Lamp Disable signal is active whenever the hazard switch (not shown) is activated. Module 108 provides an Indicator Lamp output signal to module 106 which is responsive to the Indicator Lamp signal to activate an appropriate one or more of the turn signal lamps 20–30 according to the states of the various internal switches of module 106. As with lamp control module 12 of FIGS. 1–3, lamp control module 108 includes a signal path 34' that is connected to a lamp system designation terminal 34. In the operation of system 100, switch module 106 is operable to provide MOD FEED signal to lamp control module 108 upon activation of a turn signal switch (not shown). Lamp control module 108 is responsive to the MOD FEED signal to provide a periodic Indicator Lamp signal (at a predetermined flash rate) on signal path 114. Module 106 is operable to direct the Indicator Lamp signal to an appropriate one or more of the lamps 20–30 as is known in the art.

Figure 5:
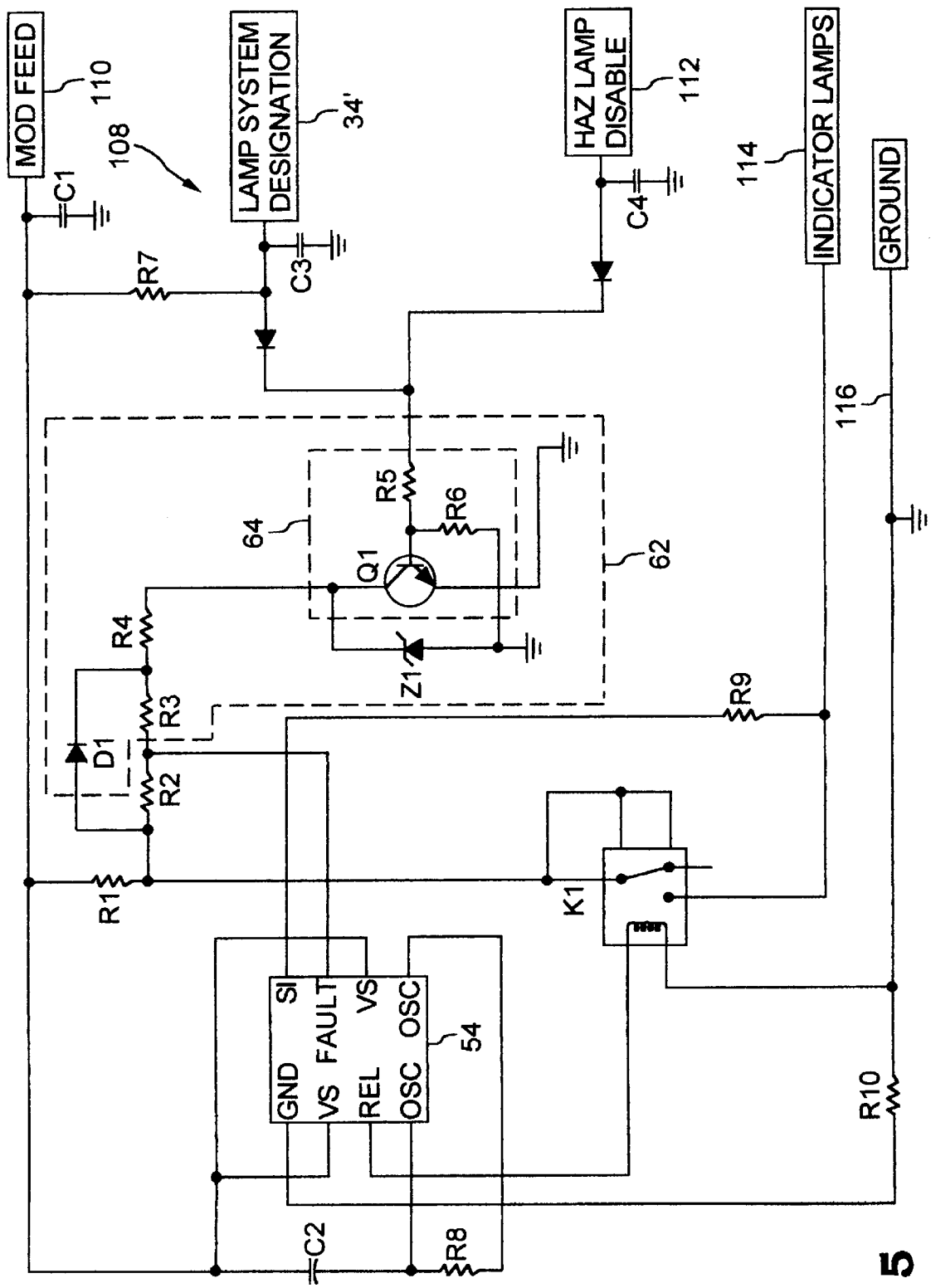
FIG. 5 is a schematic diagram illustrating one preferred embodiment of the lamp control module of FIG. 4, in accordance with the present invention.

Referring now to FIG. 5, one embodiment of a lamp control module 108, in accordance with the present invention, is shown. The MOD FEED signal path 110 is connected to one end of a capacitor C1, to one end of a resistor R7, to one end of shunt resistor R1, to one end of a capacitor C2 and to a pair of VS inputs of flasher control circuit 54. The opposite end of C1 is connected to ground potential and the opposite end of R7 is connected to one end of a capacitor C3, to an anode of a blocking diode and to lamp system designation terminal 34. The cathode of the blocking diode is connected to the cathode of a second blocking diode and to the base input of a NPN transistor circuit 64. The anode of the second blocking diode is connected to one end of a capacitor C4 and to the Hazard Lamp disable circuit path 112. The opposite end of C4 is connected to ground potential.

The opposite end of shunt resistor R1 is connected to a switch input of a relay K1. The "deenergized" position of K1 is open and the "energized" switch position of K1 is connected to Indicator Lamp signal path 114 and to one end of a resistor R9, the opposite end of which is connected to the S1 input of flasher circuit 54. The REL output of circuit 54 is connected to the activation control input of relay K1 and a resistor R8 is connected across a pair of OSC inputs of circuit 54. One end of R8 is also connected to capacitor C2, and a GND terminal of circuit 54 is connected to a resistor R10, the opposite end of which is connected to ground 116.

A control circuit 62, preferably identical in structure and operation to control circuit 62 of FIG. 3, is connected to the FAULT input of circuit 54 and to the common connection of R1 and K1 as shown. Resistor R2 of FIG. 5 corresponds to resistor R18 of FIG. 3, resistor R3 corresponds to resistor R22 of FIG. 3, resistor R4 corresponds to resistor R21 of FIG. 3, zener diode Z2 corresponds to zener diode Z5 of FIG. 3 and transistor Q1 corresponds to transistor Q10 of FIG. 3.

Module 108, like module 12 of FIGS. 1 and 3, is operable in a first mode, with lamp system designation terminal 34 floating, to control a 2:4 lamp system as described with respect to FIG. 3. Additionally, module 108 is operable in a second mode, with lamp system designation terminal 34 grounded, to control a 3:6 lamp system also as described with respect to FIG. 3. In either case, flasher circuit 54, which is preferably identical to the flasher circuit 54 of FIG. 3, is operable to control the frequency of lamp activation by controlling the frequency of the periodic Indicator Lamp signal provided to module 106 via signal path 114.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A programmable turn signal and hazard flasher control system, comprising:

a shunt resistor having one end adapted for connection to a voltage source and an opposite end adapted for coupling in a first mode to a first number of vehicle loads and in a second mode to a second number of vehicle loads;

means responsive to a load activation request signal for conducting a first load current through said shunt resistor in said first mode and a second load current through said shunt resistor in said second mode;

a control circuit having a first input connected to said opposite end of said shunt resistor, a second input and an output, said control circuit responsive to a first signal state at said second input to produce a load activation signal at said output when said shunt resistor is conducting said first load current therethrough and to a second signal state at said second input to produce said load activation signal at said output when said shunt resistor is conducting said second load current therethrough; and a monitoring circuit having an input coupled to said output of said control circuit and producing a warning signal at an output thereof if said load activation signal falls outside of a load activation signal range.

2. The system of claim 1 further including means responsive to a driver request for producing said vehicle load activation request signal.

3. The system of claim 1 wherein said control circuit includes:
a resistor network having one end connected to said first input, and a tap therefrom defining said control circuit output; and
a switching device having a signal input connected to a second opposite end of said resistor network and a control input defining said second control circuit input, said switching device responsive to said first signal state to establish a predefined load activation voltage at said resistor network tap when said shunt resistor is conducting said first load current therethough and to said second signal state to establish said predefined load activation voltage at said resistor network tap when said shunt resistor is conducting said second load current therethrough.

4. The system of claim 3 wherein said control circuit further includes a zener diode having one end connected to said second end of said resistor network and an opposite end connected to a signal output of said switching device.

5. The system of claim 4 wherein said switching device is a transistor.

6. The system of claim 1 wherein said monitoring circuit further includes a flasher circuit having an output adapted for coupling to said vehicle loads, said flasher circuit responsive to said load activation request signal to conduct said first load current through said shunt resistor in said first mode at a first switching frequency and to conduct said second load current through said shunt resistor in said second mode at said first switching frequency.

7. The system of claim 6 wherein said flasher circuit is responsive to said load activation signal falling outside said load activation signal range to conduct said first load current through said shunt resistor in said first mode at a second switching frequency and to conduct said second load current through said shunt resistor in said second mode at said second switching frequency.

8. The system of claim 7 wherein said second switching frequency is approximately twice said first switching frequency.

9. The system of claim 1 wherein said vehicle loads include vehicle turn signal lamps.

10. The system of claim 9 wherein said vehicle loads further include trailer turn signal lamps.

11. The system of claim 1 further including a switching unit disposed between said opposite end of said shunt resistor and said vehicle loads, said switching unit responsive to driver activation thereof to produce said load activation request signal and direct load current flowing through said shunt resistor to appropriate ones of said vehicle loads.

12. A programmable turn signal and hazard flasher control system, comprising:
a shunt resistor having one end connected to a voltage source and an opposite end coupled in a first mode to a first number of turn signal illumination devices and in a second mode to a second number of turn signal illumination devices;
means for activating at least one of said first number of turn signal illumination devices in said first mode and at least one of said second number of turn signal illumination devices in said second mode;
a control circuit having a first input connected to said opposite end of said shunt resistor, a second input and an output, said control circuit responsive to a first signal state at said second input to produce a load activation signal when said at least one of said first number of turn signal illumination devices is activated in said first mode and to a second signal state at said second input to produce said load activation signal at said output when said at least one of said second number of turn signal illumination devices is activated in said second mode; and
a monitoring circuit having an input coupled to said output of said control circuit and producing a warning signal at an output thereof if said load activation signal falls outside of a load activation signal range.

13. The system of claim 12 wherein said control circuit includes:
a resistor network having one end connected to said first input, and a tap therefrom defining said control circuit output; and
a switching device having a signal input connected to a second opposite end of said resistor network and a control input defining said second control circuit input, said switching device responsive to said first signal state to establish a predefined load activation voltage at said resistor network tap when said at least one of said first number of turn signal illumination devices is activated in said first mode and to said second signal state to establish said predefined load activation voltage at said resistor network tap when said at least one of said first number of turn signal illumination devices is activated in said second mode.

14. The system of claim 12 wherein said monitoring circuit further includes a flasher circuit responsive to a load activation request signal to activate said at least one of said first number of turn signal illumination devices at a first switching frequency in said first mode and to said load activation request signal to activate said at least one of said second number of turn signal illumination devices at said first switching frequency in said second mode.

15. The system of claim 14 wherein said flasher circuit is responsive to said load activation signal falling outside said load activation signal range to activate said at least one of said first number of turn signal illumination devices at a second switching frequency in said first mode and to activate said at least one of said second number of turn signal illumination devices at said first switching frequency in said second mode.

16. The system of claim 15 wherein said second switching frequency is approximately twice said first switching frequency.

17. The system of claim 12 wherein said first number of turn signal illumination devices includes a number of vehicle turn signal illumination devices.

18. The system of claim 17 wherein said second number of turn signal illumination devices includes a number of vehicle turn signal illumination devices and a number of trailer turn signal illumination devices.

19. The system of claim 18 further including means for coupling said number of vehicle turn signal illumination devices to said number of trailer turn signal illumination devices.

20. The system of claim 19 wherein said means for coupling said number of vehicle turn signal illumination devices to said number of trailer turn signal illumination devices includes means for establishing said first signal state at said second input of said control circuit, said second signal state being established at said second input of said control circuit in the absence of said means for coupling.

* * * * *